United States Patent [19]

Nilsen

[11] 4,272,004
[45] Jun. 9, 1981

[54] Z-BAR GUIDE APPARATUS

[75] Inventor: Carl J. Nilsen, Hopatcong, N.J.

[73] Assignee: SWS Incorporated, Landing, N.J.

[21] Appl. No.: 88,197

[22] Filed: Oct. 23, 1979

[51] Int. Cl.³ ............................................. B23K 37/04
[52] U.S. Cl. ...................................... 228/17.5; 113/8;
228/146
[58] Field of Search .................... 228/15.1, 49 R, 17.5,
228/144, 146, 147; 113/7 R, 8, 116 W

[56] References Cited

U.S. PATENT DOCUMENTS

| | | | |
|---|---|---|---|
| 2,883,956 | 4/1951 | Nordquist | 113/8 X |
| 3,285,490 | 11/1966 | Roper | 228/17.5 |
| 3,834,010 | 9/1974 | Wolfe et al. | 228/15.1 |
| 3,889,617 | 6/1975 | Lorenzen et al. | 113/116 W X |
| 4,145,986 | 3/1979 | Bauer | 228/17.5 X |
| 4,160,892 | 7/1979 | Opprecht et al. | 219/83 |

FOREIGN PATENT DOCUMENTS 2426379 of 1975 Fed. Rep. of Germany .......... 228/17.5

*Primary Examiner*—Richard B. Lazarus
*Attorney, Agent, or Firm*—Dowell & Dowell

[57] ABSTRACT

An apparatus for positioning and guiding the opposed edges of sheet metal so that the edges thereof are progressively moved into substantially intimate relationship with one another so that such edges may be subsequently welded to form a seam. The apparatus includes three replaceable guide elements that cooperatively form opposed and relatively converging guide channels which progressively direct the sheet metal edges into intimate relationship and maintain such relationship as the sheet metal is introduced into a seam welding station.

12 Claims, 7 Drawing Figures

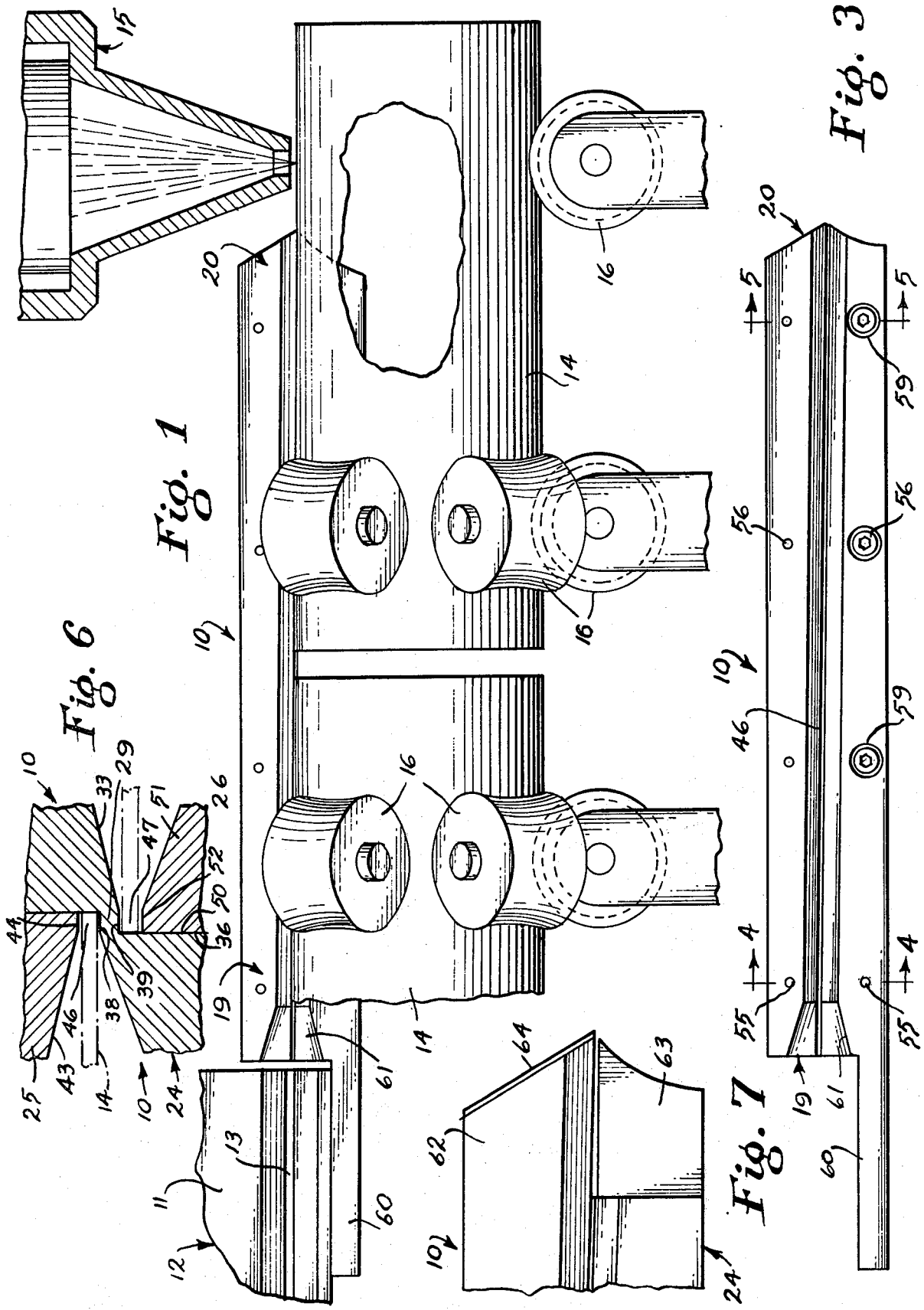

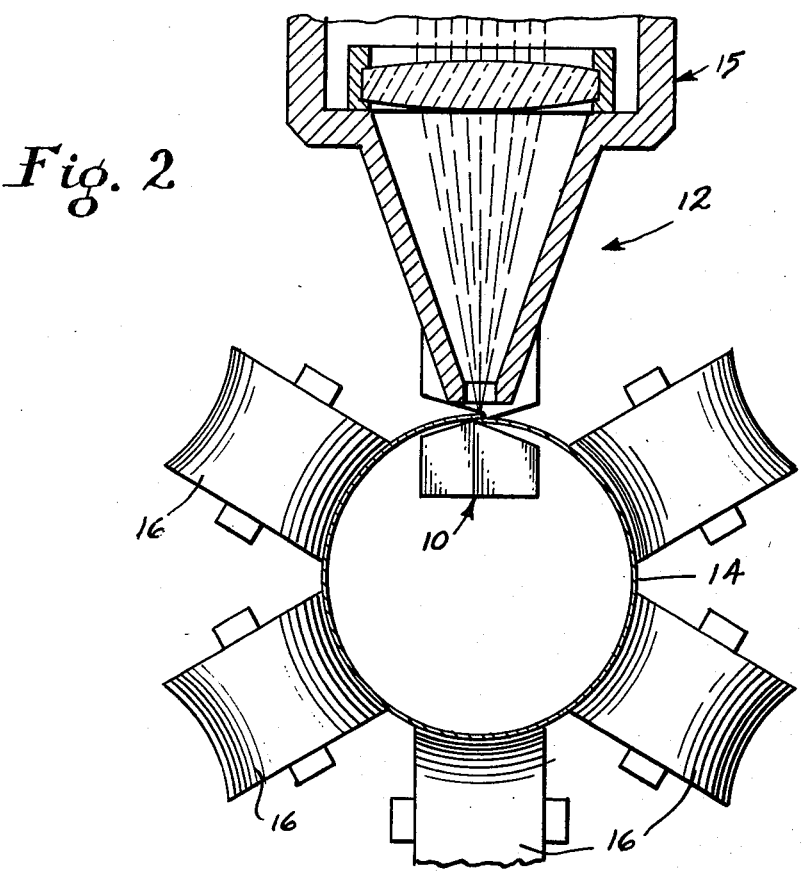
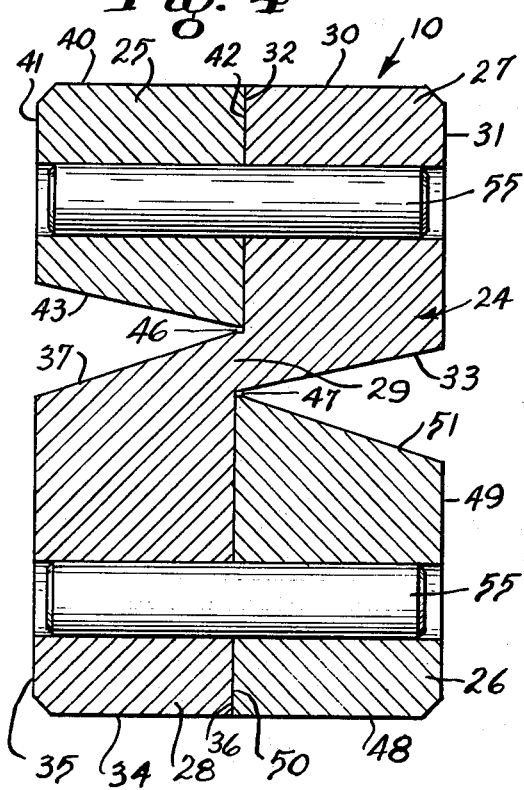

Z-BAR GUIDE APPARATUS

FIELD OF THE INVENTION

This invention relates generally to apparatus for guiding the edges of sheet metal into intimate engagement with each other prior to welding such edges together and is particularly directed to a Z-bar having three individually replaceable guide members which are co-operatively assembled to create a pair of overlapping vertically converging guide channels in which the edges of one or more sheet metal work members are directed so as to guide the edges into substantially intimate contact and which may be subsequently welded to form a seam using a laser welder.

SUMMARY OF THE INVENTION

This invention is embodied in a three-piece Z-bar which guides the edges of sheet metal or other sheet material into intimate engagement with each other prior to introducing the sheet material into a laser or other welding machine, particularly of the type used in the shaping and welding of cans, tubes and the like. The Z-bar includes a central portion having vertically offset upper and lower portions connected by a web which is progressively reduced in thickness along its length so as to be substantially narrower at the discharge end of the apparatus than at the forward end thereof. Upper and lower guide bars are removably connected in fixed adjusted position to the central portion. Opposed channels having sharp corners and a narrow width are created between the upper and lower guide bars and the central guide member. The opposed channels converge or taper from the feed or forward end of the Z-bar to the discharge end thereof to provide overlapping slots which converge vertically along the entire length of the Z-bar.

It is a primary object of this invention to provide a Z-bar or guide apparatus for machines used in can and tube forming and welding and in which the surfaces which are subject to the most wear can be readily removed and replaced or resurfaced for further use.

It is a further object of this invention to provide a Z-bar for use in seam welding of sheet material in which the guide grooves of the Z-bar are adjustable to accommodate material of different thicknesses and such grooves converge to a vertically juxtaposed overlapping relationship having a spacing of approximately 0.005 inch (0.127 mm) at the discharge end so as to maintain the edges of the sheet material in substantially intimate engagement with each other at a point adjacent to the welding head.

It is another object of this invention to provide a Z-bar apparatus for use in seam welding sheet material in which the surfaces that are subject to the most wear are formed of a wear-resistant material such as tool steel, or a carbide such as silicon carbide, tungsten carbide, or the like, while parts subject to less wear may be made from other less expensive material.

It is a further object of this invention to provide a Z-bar which is particularly adapted for use in laser welding of sheet material and which guides the edges of the sheet material in overlapping converging channels and thereby guides such edges into substantially intimate engagement with one another as they are discharged from the Z-bar without the aid of vertically disposed supplemental pressing rollers or other guide members to force the edges of the sheet metal together.

It is a further object of this invention to provide a Z-bar for laser welding of cans or tubular bodies in which the guide bar apparatus maintains the edges of the sheet material in overlapping relationship with the overlap being not more than the thickness of the sheet material.

It is another object of this invention to provide a Z-bar for welding the edges of sheet material in which guide bars extend beyond the channels in which the edges of the sheet material are initially guided and the extended portions of such guide bars may cause the edges to be in abutting relationship with each other at the welding station.

It is still another object of this invention to provide a Z-bar in which the channels that guide the edges of the sheet material are provided with sharp corners along the guiding surfaces and portions of the apparatus which form the channels are adjustable to accommodate materials of different thicknesses as well as to maintain a predetermined channel width when such portions have eroded slightly.

BRIEF DESCRIPTION OF THE DRAWINGS

FIG. 1 is a side elevational view illustrating one application of the invention.

FIG. 2 is an end elevational view thereof.

FIG. 3 is a side elevational view of the Z-bar per se.

FIG. 4 is an enlarged sectional view taken on the line 4—4 of FIG. 3.

FIG. 5 is an enlarged sectional view taken on the line 5—5 of FIG. 3.

FIG. 6 is an enlarged fragmentary sectional view illustrating the details of the web portion of the Z-bar.

FIG. 7 is an enlarged fragmentary side elevational view of another embodiment of the invention.

DESCRIPTION OF THE PREFERRED EMBODIMENTS

With continued reference to the drawings, the present invention includes a Z-bar 10 which is mounted on a portion 11 of the frame of a conventional can forming machine 12. The portion 11 normally is relatively narrow in cross-section and may include a relatively wide groove 13 on each side for initially receiving and guiding the edges of one or more sheets of metal or other material 14. Although the Z-bar of the present invention may be used to form a seam weld on any conventional sheet materials and may be used with any conventional can or tube forming and welding machines, it is shown in the preferred embodiment as it is used in conjunction with a forming machine having a laser welder 15. The Z-bar 10 extends along the can forming and welding machine 12 and terminates adjacent the laser welder 15, as shown in FIG. 1.

In manufacturing cylindrical bodies such as cans or tubes, the sheet metal or other sheet material 14 is introduced into the feed end of the can forming machine and is urged into a cylindrical configuration by a plurality of spaced rollers 16. As shown in FIG. 1, there may be several sets of such rollers disposed along the length of the machine which cause a substantially flat sheet of material to be formed into a generally cylindrical configuration with the side edges being slidably received within the grooves 13. It should be noted that although the drawings depict a series of rollers for forming the sheet material, other conventional forming mechanisms, such as arcuately shaped forming rings or guide rods may be used.

In addition to the means for forming the sheet material, there also must be some means provided for advancing the sheet material along the frame portion 11, the Z-bar 10 and through the welding station. In this regard, conventional chain type conveyors, drive rollers, reciprocating pistons or push rods or the like may be used depending upon the type of conventional welder involved. As it is believed that the type of advancing mechanism is not necessary to the understanding of the present invention, such advancing mechanism has not been shown in the drawings.

As was noted earlier, this invention is particularly useful for making seam welds with laser welders. In this regard, the laser welder 15 is mounted on the frame adjacent the discharge end of the Z-bar 10 and in a position such that the laser beam may be focused on the sheet material which has passed through the Z-bar.

With particular reference to FIGS. 3-6, the Z-bar 10 of the present invention includes a first or feed end 19 located adjacent the frame portion 11 and extends to the discharge end 20 which is positioned in close proximity to the welder 15. Such Z-bar is constructed of three elongated components including a central guide member 24 and a pair of elongated upper and lower guide bars 25 and 26. The central guide member includes an upper portion 27 and a vertically offset lower portion 28 which are interconnected by means of a web portion 29. The upper portion 27 of the central guide member 24 includes an upper wall 30, outer wall 31, inner wall 32 and lower wall 33. The lower portion of the central guide member 24 includes a lower wall 34, outer wall 35, inner wall 36 and upper wall 37.

The web portion 29 which connnects the upper and lower portions of the central guide member extends generally horizontally and has upper and lower surfaces 38 and 39. The upper surface 38 extends from the inner wall 32 of the upper portion of the central guide member to the upper wall 37 of the lower portion thereof. The lower surface 39 extends from the inner wall 36 of the lower portion of the central guide member to the lower wall 33 of the upper portion.

It should be noted that the lower wall 33 of the upper portion of the central guide member angles downwardly and inwardly from the outer wall 31 to the lower surface 39 of the web 29. On the other hand, the upper wall 37 of the lower portion of the central guide member angles upwardly and inwardly from the outer wall 35 to the upper surface 38 of the web 29.

The web portion of the Z-bar is vertically tapered along its length being thicker adjacent the feed end of the Z-bar and converging toward the discharge end thereof. In this regard, FIG. 4 is a cross-sectional view of the Z-bar showing the web portion adjacent the feed end of the Z-bar wherein substantially the maximum thickness of the web is illustrated. In contrast FIG. 5 is a cross-sectional view of the Z-bar which shows the web portion adjacent the discharge end of the Z-bar where the web is of minimum thickness. At the discharge end of the Z-bar it is preferred that the thickness of the web is approximately 0.005 inch (0.127 mm). The taper given to the web portion is relatively constant from one end of the Z-bar to the other end and causes the edges of the sheet material to be substantially in intimate engagement with each other as the material passes beneath the welder 15. This permits a satisfactory welded seam to be achieved.

The upper guide rail or bar 25 is mounted on the central guide member 24 above and in spaced relationship with the lower offset portion 28 and includes an upper wall 40, outer wall 41, inner wall 42, and lower wall having first and second wall segments 43 and 44. The wall segment 43 is inclined downwardly and inwardly from the outer wall 41 to the point of intersection with the wall segment 44. Wall segment 44 is disposed generally parallel to the upper surface 38 of the web 29 and extends generally horizontally from the inner wall 42 of the upper guide bar 25 to the point of intersection with the inclined segment 43 of the lower wall.

The area defined by the wall segment 44 of the upper guide bar 25, the surface 38 of the web portion 29, and a portion of the inner wall 32 of the central guide member constitutes a first or upper channel 46 in which one edge of the sheet material being formed or shaped is guided.

The upper guide bar 25 is mounted so that the inner wall 42 thereof is flush against the inner wall 32 of the upper portion of the central guide member and the upper walls 30 and 40 of the upper portion of the central guide member and upper guide bar, respectively, are substantially coplanar. In this manner the tapered lower wall segment 43 of the upper guide bar 25 and the upper sloped or tapered surface 37 of the lower portion of the central guide member define an elongated outwardly flared opening which permits the sheet material to slide along the upper channel 46.

A second or lower channel 47 which is similar to the channel 46 is formed between the lower guide bar 26 and the upper portion 27 of the central guide member 24. In this regard, the lower guide bar 26 is vertically spaced and offset from the upper guide bar 25 and is located on the opposite side of the web portion 29 of the central guide member.

The lower guide bar 26 includes a lower wall 48, outer wall 49, inner wall 50 and an upper wall having an inclined portion 51 and a horizontal portion 52. The horizontal portion 52 of the upper wall of the lower guide bar is spaced from the lower surface 39 of the web 29 and extends generally parallel thereto. The area between the wall portion 52, the lower surface 39 of the web and a portion of the inner wall 36 of the lower portion 28 of the central member defines the lower channel 47.

The upper and lower guide bars 25 and 26 are removably mounted on the upper and lower portions 27 and 28, respectively, of the central guide member by a combination of dowels 55 and cap screws 56. Preferably, the guide bars 25 and 26 are mounted in a manner to permit the size of the channels 46 and 47 to be adjusted to accommodate materials of different thicknesses as well as to permit adjustment of the bars when the channels become enlarged due to wear. In order to do this, the dowels 55 are press fitted through aligned openings which extend through the guide bars and central guide member, respectively, adjacent to the feed end of the Z-bar. The cap screws 56 are spaced along the length of the Z-bar and are received in threaded openings 57 in the central guide member. An enlarged bore 58 extends through the guide bars 25 and 26 in alignment with each opening 57 and each of the bores 58 includes a counterbore 59 in which the heads of the screws 56 are received. It is noted that the bores 58 and counterbores 59 are large enough to permit limited pivoted movement of the guide bars about the dowels 55 to permit the discharge ends of the channels to be adjusted and thereafter to be fixed in adjusted position.

In the present instance, the material used to make cans ordinarily has a thickness in the range of 0.005 inch (0.127 mm) to 0.012 inch (0.30 mm) and preferably has a thickness of approximately 0.008 (0.203 mm). With particular reference to FIGS. 4 and 5, the channel 46 is progressively reduced in width along the length of the Z-bar and is preferably approximately 0.015 inch (0.406 mm) wide adjacent the feed end of the Z-bar (FIG. 4) and is approximately 0.010 inch (0.255 mm) wide adjacent the discharge end of the Z-bar (FIG. 5) when the material being used is 0.008 inch (0.203 mm) thick. If material of another thickness is to be used, the upper and lower guide bars are adjusted accordingly relative to the central guide bar member.

With particular reference to FIG. 3, the lower portion of the central guide members includes an elongated mounting tongue 60 which extends outwardly from the feed end of the Z-bar. A plurality of openings are provided in the tongue through which screws or other fastening means (not shown) may be inserted and cooperatively received in aligned openings in the frame portion 11 of the forming machine. Thus when the tongue 60 is secured to the frame portion, the Z-bar will extend outwardly substantially to the welder 15.

With continued reference to FIG. 3, the channel 46 is shown as also having a flared feed end portion 61 and it is noted that channel 47 has a similar portion on the opposite side of the Z-bar. Such flared portions function to initially receive the edges of sheet material which are passing along the grooves 13 of the frame portion 11 and are introduced into the channels 46 and 47 of the Z-bar. The flared end is created by initially tapering the opposed inclined surfaces of the guide bars and central mounting member.

As previously described, the channels 46 and 47 are reduced in dimension from the feed end toward the discharge and of the Z-bar in order to more positively control the relative positioning of the edges of the sheet material as such edges are moved along the length of the Z-bar. Further and with particular reference to FIG. 6, the width of the web member must be sufficient to offset the upper and lower portions of the central guide member so that channel 46 extends inwardly and overlaps channel 47 for the entire length of the Z-bar. The amount of overlap, of course, depends upon the type of welding to be performed; however, in laser welding of a lap seam it is preferred that the edges of the sheet material exit from the discharge end of the Z-bar in an overlapped relationship which should not exceed one thickness of the sheet material, as for example, 0.008 inch (0.203 mm) when the material has a thickness of 0.008 inch (0.203 mm). The degree of overlap is due to the fact that the laser will be focused on a spot which is approximately 0.010 to 0.015 inch (0.255 mm to 0.382 mm) in diameter.

In some conventional welding machines, a pair of pressure rollers are disposed adjacent the discharge end of the Z-bar and above and below the edges of the sheet material. The rollers function to urge and maintain the overlapped edges in intimate contact at the point of or adjacent to the weld; however, with the present invention such rollers are not necessary. Instead, the tapered web 29 causes the overlapped edges of sheet material passing from the discharge end of the Z-bar to continue moving toward each other until such overlapping edges intimately engage each other at the welder 15. To achieve the desired contacting engagement of the overlapped edges to be welded, it has been found that the web adjacent the discharge end of the Z-bar should be approximately 0.005 inch (0.127 mm). Other dimensions may be used; however, consideration must be given to the structural integrity of the web.

Since the web is the structural member which separates channels 46 and 47, the channels converge vertically relative to one another as the web tapers. However the width characteristics of each channel should be maintained as the channels converge relative to each other so as to insure that the edges of the sheet material passing therethrough will continue to be urged into close vertical proximity.

As shown in FIG. 3, channel 46 is tapered downwardly along the length of the Z-bar and thereby converges toward channel 47 as the web is decreased in thickness. This is achieved by tapering the lower wall 43 along the length of the upper guide bar 25. The amount of taper will depend upon the length of the Z-bar and the final vertical spacing between the channels as defined by the thickness of the web 29.

In a similar manner the upper surface 37 of the lower portion 28 of the central guide member 24 is tapered downwardly along the longitudinal axis from the feed end to the discharge end of the Z-bar. Again reference is made to the cross-sections as shown in FIGS. 4 and 5 adjacent the feed end and discharge end of the Z-bar, respectively. However, in this case the cross-section of the lower portion 28 of the central guide member is continually reduced from FIG. 4 to FIG. 5 as the upper guide bar 25 increases in cross-section. Further the angle or degree of slope from one end of the wall 37 to the other should be substantially complementary to that of the corresponding slope of the vertically disposed lower wall 43 of the upper guide bar 25.

Thus as the web 29 decreases in thickness from the feed end of the Z-bar to the discharge end thereof, the lower wall 43 of the upper guide bar 25 and the upper surface 37 of the lower portion of the central guide member will taper downwardly relative to the Z-bar and thereby channel 46 declines from the feed end of the Z-bar to the discharge end thereof. In effect channel 46 converges toward channel 47 along the length of the Z-bar.

However, instead of causing the channel 46 to converge toward channel 47, along the length of the Z-bar, channel 46 could be maintained substantially constant while the opposing walls 33 of the upper portion 27 of the central guide member and the wall portion 51 of the lower guide bar 26 may be inclined so as to cause channel 47 to converge toward channel 46. In addition, it is contemplated that both channels could be caused to converge toward one another.

As it is critical to a proper weld that the overlapped edges of the can or other article being welded be maintained substantially in intimate engagement, the guide bars 25 and 26 may include nose portions 62 and 63 which extend outwardly from the discharge end of the central guide member to a point contiguous to the welder 15. Also, it is noted that in some instances only one of the guide bars may be provided with an outwardly extending nose portion. The extended nose portions 62 and 63 of the upper and lower guide bars maintain the edges of sheet material in substantially intimate engagement after exiting channels 46 and 47 until the overlapping material reaches the point at which the welding occurs. However, due to the reflective heat to which the upper extended portion may be subjected when a laser welder is used, such portion preferably is coated with a polished copper or other highly reflective material is indicated at 64 in FIG. 7.

When the guide bars 25 and 26 are provided with extended nose portions, such guide bars are adjusted relative to the central guide member 24 so that the discharge ends of the nose portions 62 and 63 are spaced apart a distance which is substantially twice the thickness of the material being welded when a lap seam is being formed. As an example, when the material being welded has a thickness of 0.008 inch (0.203 mm), the discharge ends of the nose portions are spaced apart a distance of substantially 0.016 inch (0.406 mm). This causes the edges of the material to be in intimate overlapping relationship as the material passes the welder 15.

In the past, it has been well known in the welding industry in general and the can welding industry in particular that it is difficult to butt weld the sheared or slit edges of tinplate or other sheet material in a substantially continuous welding operation without applying pressure to the contiguous edges. The sheared or slit edges of the material normally are irregular in both the length and thickness of the material since neither a shearing blade nor a saw blade leaves an edge which is smooth enough to butt weld. When pressure is applied to the abutting edges during the welding process, the material is melted by the welder and simultaneously the pressure on the edges causes such edges to move toward each other with a forging type action.

In the present invention, the forming rollers 16 urge the edges of the sheet material into intimate sliding engagement with the bottoms of the grooves 46 and 47 so that such edges are in overlapping relationship with each other. However, it has been discovered that if the discharge ends of the nose portions 62 and 63 are adjusted toward each other so that the spacing between such portions is approximately the same as the thickness of one layer of the material, the overlapping edges spread apart so that the edges are in abutting relationship. This spreading causes the edges to move out of overlapping relationship and into abutting relationship, while the forming rollers 16 continue to urge such edges toward each other. Preferably, the point of intersection of the edges which are in contiguous abutting relationship occurs at the welder 15. As the sheet material is moved past the welder, the pressure which is applied by the rollers 16 causes the edges of the material to move toward each other when material of such edges is heated to a flowable state by the welder and provides a substantially continuous butt seam weld.

Due to the replaceable characteristics of the three-part configuration of the Z-bar, the parts may be made of different material depending upon the need for machinability and wear. For example, the central guide member may be made of a carbide material such as silicon carbide or may be made of other hard materials such as tool steel or the like, while the side guide bars may be made of the same material or may be made of a different wear-resistant material.

In conventional one-piece Z-bars, it is difficult and time consuming to machine or otherwise form the channels which guide the edges of the sheet material into overlapping relationship with each other. This is particularly true when the guide channels have a narrow width and it is desirable to have sharp square corners at the base of such channels to facilitate the sliding of the sheet material. Additionally, frictional engagement between the edges of the sheet material and the Z-bar tends to erode the material of the Z-bar and enlarge the channels, particularly when the sheet material is being moved at a speed of from 60 to 200 feet (15.23 to 50.76 meters) per minute. Further, in order to reduce the frictional wear, it has been necessary to use a harder steel alloy which inherently leads to less malleability and greater brittleness in the material which in turn increases the difficulty in machining the channels. In the present invention, the central guide member 24 and the upper and lower guide bars 25 and 26 are formed separately and may be finished by surface grinding or other techniques or may be formed by precision casting to insure that the bottom corners of the channels are sharp and do not include fillets or chamfers.

Also, it is contemplated that the several elements of the Z-bar 10 may be constructed of a less expensive, more malleable material after which each element or a portion of each element may be coated with a wear-resistant material having a low coefficient of friction, such as Armaloy, chromium or the like. Such coating may be applied in a conventional manner such as by an electrodeposition process, chemical coating, electrostatic coating or the like. Normally, Z-bars having grooves in the range of sizes contemplated herein cannot be successfully coated with a hard wear-resistant material by conventional processes since the grooves have a tendency to either collect the coating material therein with inherent clogging of the grooves or such grooves may resist penetration by the coating material. However, with the multi-element Z-bar of the present invention, such elements are coated and finished separately and are then assembled and adjusted.

Since the central guide member and the upper and lower guide bars are formed separately, they may be removed and replaced independently without the necessity of replacing the entire Z-bar. Also it is apparent that the portion of the Z-bar which receives the greatest wear may be formed of or coated with the hardest material while the portions which receive less wear may be made of a softer material which can be finished more easily. Since the parts are independently replaceable, it is apparent that a smaller stock may be maintained on hand and that a smaller capital investment is involved.

In use, the Z-bar of the present invention is mounted on the main frame of a welding machine and sheets of material having a desired thickness, for example, a thickness of approximately 0.008 inch (0.020 mm), are advanced toward the feed end of the Z-bar. As the sheet material advances, the forming rollers urge the sheet material into a cylindrical configuration. As the advancing apparatus moves the sheet material forwardly, the opposed edges are received within the flared openings of the overlapping channels 46 and 47 and are guided into overlapping relationship along the length of the Z-bar. As the sheet material continues to be advanced, the edges of the sheet material converge toward each other so as to be in substantially intimate engagement as they are discharged from the Z-bar and are advanced to a welder. By adjusting portions of the Z-bar, the edges of the sheet material may be in intimate overlapping relationship as they pass the welder for forming a lap seam or such edges may be in contiguous abutting relationship for forming a butt seam.

I claim:

1. A Z-bar apparatus for guiding the edges of sheet material into overlapping relationship with each other as the material is being moved to a welding apparatus, comprising an elongated central guide member and elongated upper and lower guide bar means, said central guide member having upper and lower vertically offset portions connected by a web having upper and lower surface, means for removably mounting said upper and lower guide bar means on said upper and lower portions of said central guide member, a first channel formed by portions of said lower portion of said central guide member and said web and said upper guide bar means, a second channel formed by portions of said upper portion of said central guide member and said web and said lower guide bar means, said first and second channels being in vertically spaced overlapping relationship with one another along the entire length of said central member and being of a size to slidably receive and guide the edges of the sheet material, each of said channels having substantially sharp corners along the base portion, at least one of said channels tapering relative to the other along its length so that said channels progressively converge vertically relative to one another along the length of said central guide members, whereby the edges of the sheet material are brought into substantially intimate engagement with one another as the sheet material is discharged from the apparatus.

2. The invention of claim 1 in which at least one of said upper and lower guide bar means includes a portion which extends longitudinally beyond the discharge end of said central guide member substantially to said welding apparatus for retaining the edges of the sheet material substantially in engagement with one another.

3. The invention of claim 2 in which the outer surface of said extended portion is coated with a highly reflective metallic coating.

4. The invention of claim 1 including means for adjusting said upper and lower guide bar means so that said edges of the sheet material are in overlapping relationship with each other as said edges reach said welding apparatus.

5. The invention of claim 1 including means for adjusting said upper and lower guide bar means so that said edges of the sheet material are in abutting relationship with each other as said edges reach said welding apparatus.

6. The invention of claim 1 in which said web is tapered along its length so that said upper and lower surfaces thereof converge toward each other along the entire length of said central guide member.

7. The invention of claim 6 in which at least one of said upper or lower guide bar means is tapered along its length so as to converge toward said web.

8. The invention of claim 6 in which the spacing between said upper and lower surfaces of said web decreases to approximately 0.005 inch adjacent to the discharge end.

9. The invention of claim 1 in which said first and second channels are approximately 0.010 inch in width at said discharge end.

10. The invention of claim 1 in which said first and second channels are tapered from a width of approximately 0.016 inch adjacent one end of said central guide member to a width of approximately 0.010 inch adjacent the other end thereof.

11. The invention of claim 1 in which said channels overlap each other by an amount substantially equal to the thickness of the sheet material.

12. A Z-bar apparatus for guiding the edges of sheet material into substantially intimate engagement with each other as the material is moved to a laser welding apparatus, comprising, an elongated central guide member having upper and lower vertically offset portions connected by a web, said web having a constant taper from one end of said guide member to the other and being relatively thick at the inlet end and relatively thin at the discharge end, a pair of elongated upper and lower guide bar means, means for removably mounting said upper and lower guide bar means on said central guide member, each of said upper and lower guide bar means having a surface spaced from said web and defining upper and lower channels of a size to slidably receive the edges of the sheet material, means for adjustably mounting each of said guide bar means on said central guide member to vary the width of said channels, said channels being in vertically spaced overlapping relationship with each other along the entire length of said Z-bar, and the inner edges of each of said channels having substantially sharp corners.

* * * * *